June 2, 1931.  P. P. QUAYLE  1,807,601
SHOT STRING METER
Filed June 6, 1927   3 Sheets-Sheet 1

Inventor
By Philip P. Quayle
Nissen & Crane Attys.

June 2, 1931.    P. P. QUAYLE    1,807,601
SHOT STRING METER
Filed June 6, 1927    3 Sheets-Sheet 3

Inventor:
Philip P. Quayle,
By Nissen & Crane,
Attys.

Patented June 2, 1931

1,807,601

UNITED STATES PATENT OFFICE

PHILIP P. QUAYLE, OF CHEVY CHASE, MARYLAND, ASSIGNOR TO THE PETERS CARTRIDGE COMPANY, OF CINCINNATI, OHIO, A CORPORATION OF OHIO

SHOT STRING METER

Application filed June 6, 1927. Serial No. 196,989.

This invention relates to a metering device for ascertaining the distribution of a charge of shot in the direction of the travel thereof, and has for one of its objects the provision of a meter of this nature which will accurately measure the spreading of the charge of shot in the direction of its travel.

A further object is to provide a device of the class named which shall be of improved construction and operation.

Other objects will appear from the following description.

The invention is exemplified in the combination and arrangement of parts shown in the accompanying drawings and described in the following specification and it is more particularly pointed out in the appended claims.

In the drawings—

Figure 1:
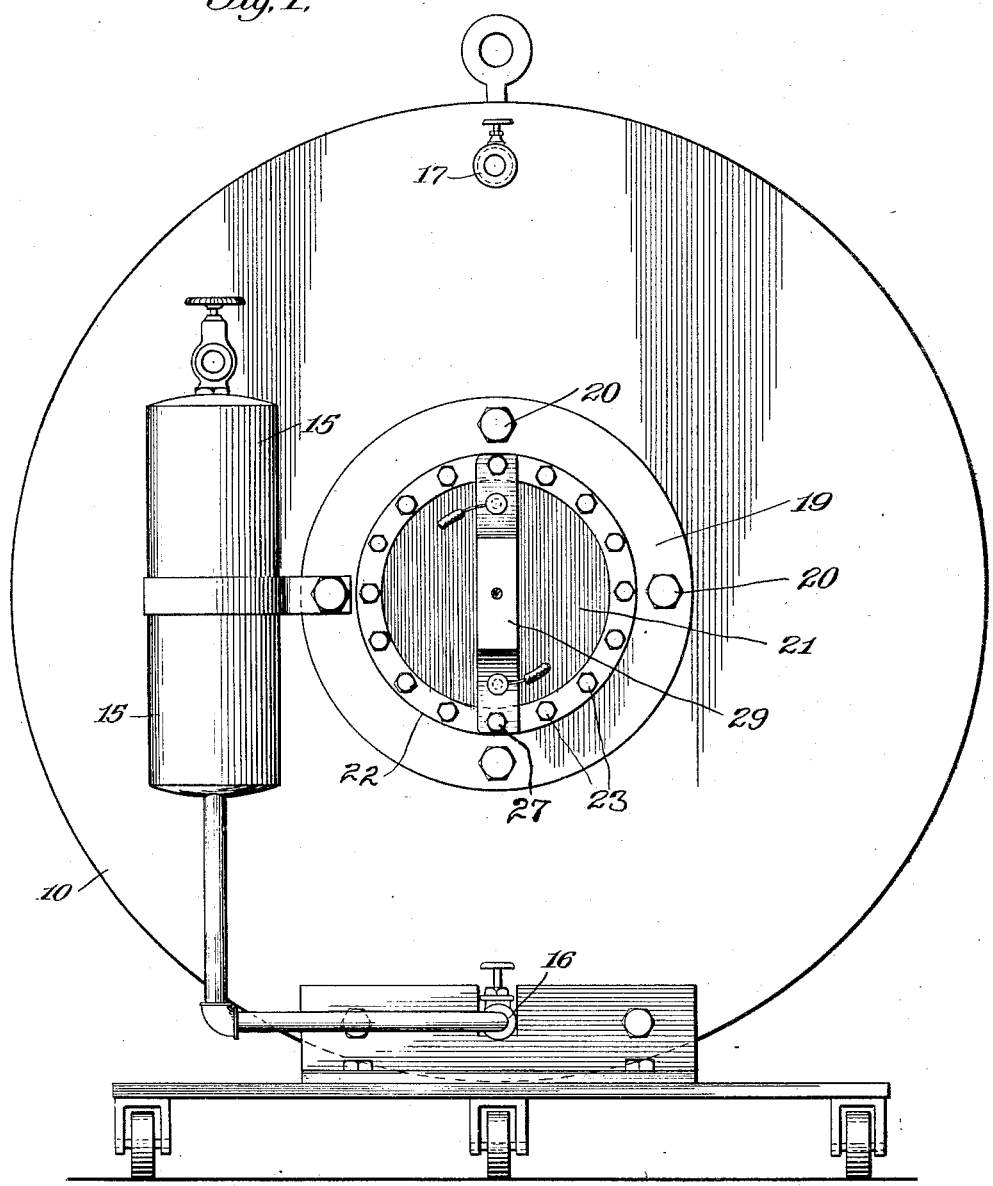
Fig. 1 is a rear elevation of a metering device embodying one form of the present invention.
Figure 2:
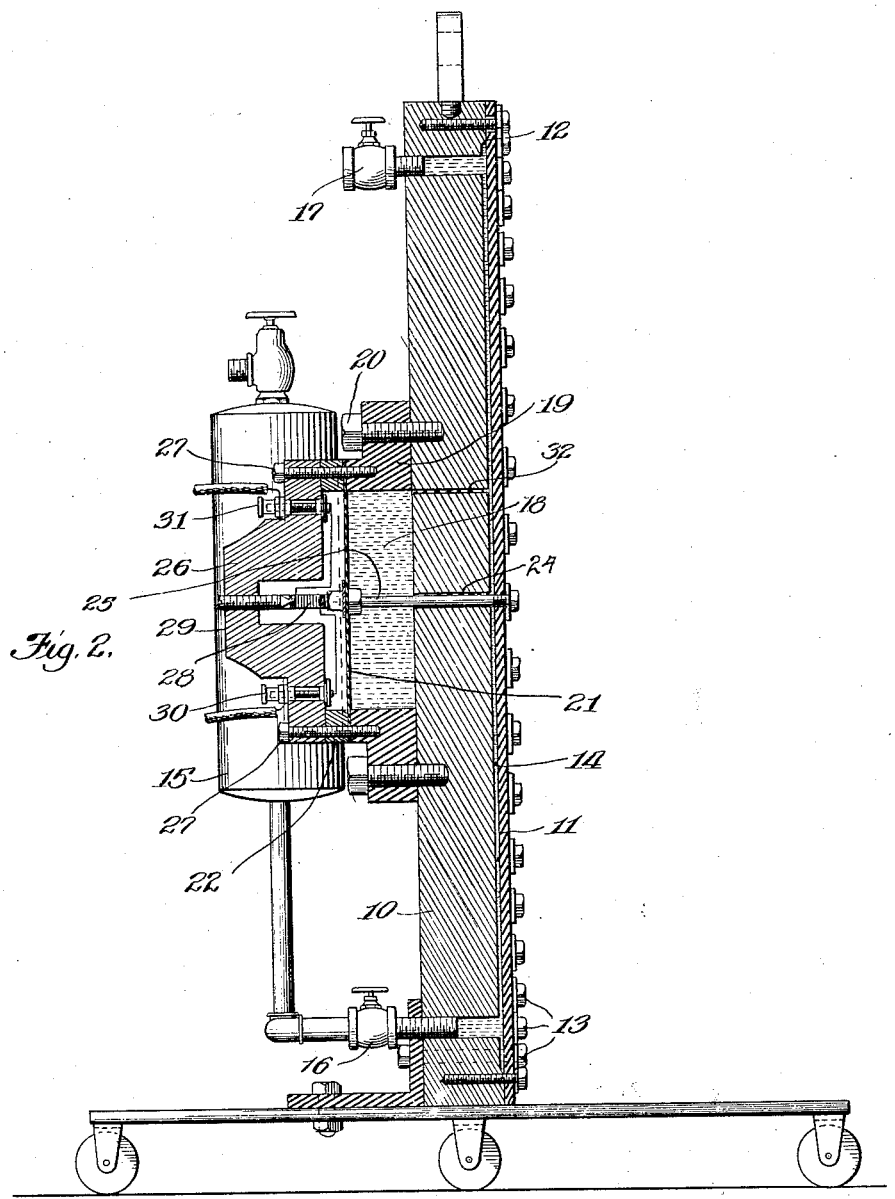
Fig. 2 is a central vertical section of the device shown in Fig. 1.

The effectiveness of a charge of shot fired from a gun depends somewhat upon the bunching or distribution of the shot in the direction of travel of the charge. If a considerable length of time elapses between the arrival of the first shot pellet in a given plane transverse to the fire and the last shot pellet of the charge, the charge will be less effective than if the pellets arrive at a given plane substantially simultaneously. The distribution of the pellets in the direction of travel is known as the shot string. The present invention provides an accurate means for measuring this shot string. It will be understood that the meter may be used for other purposes and the present invention is not restricted to any particular use to which the meter may be put.

Referring to the drawings, the numeral 10 designates a heavy back plate of cast iron or other suitable material having sufficient inertia that the impinging shot column will not perceptibly move the entire apparatus, but will expend its energy in bending the target plate 11 which covers the front of the plate 10 and which is of sufficiently thin material to bend under the impact of the charge of shot. The plate 11 is spaced slightly from the front face of the plate 10 by a raised portion 12 at the outer edge of the plate 10. A series of cap screws 13 are distributed about the periphery of the plate 11 and firmly holds the plate 11 in contact with the surfaces of the projection 12. This forms a space 14 between the two plates, which is filled with a heavy viscous oil. The oil is supplied preferably under pneumatic pressure from a reservoir 15 connected by a valve 16 to the lower portion of the plate 10, the upper portion of which is provided with a vent closed by a valve 17. The vent 17 permits filling of the space 14 without entrapping air bubbles in the viscous oil. As will appear later, it is important that the oil be free from bubbles. A chamber 18 is formed in the rear of the plate 10 by means of a ring 19 held to the plate 10 by cap screws 20. The rear of the chamber 18 is closed by a diaphragm 21 held in place by a ring 22 and screws 23. The space 14 is connected with the chamber 18 by a perforation 24 through the plate 10. A rod 25 extends through the opening 24 and connects the plate 11 with the diaphragm 21. A bridge 26 is mounted on the ring 22 and held in place by screws 27. A variable resistance member 28 is interposed between the diaphram 21 and the bridge 26 and is held in place by an adjustable screw 29. This resistance may consist of a pile of carbon discs placed face to face. The resistance of the pile varies with the pressure exerted thereon and it will be apparent that movement of the diaphragm 21 will cause a variation in pressure on the pile 28 to change the resistance thereof. The pile 28 is insulated from the instrument and the opposite ends thereof are connected to binding posts 30 and 31, respectively. A vent 32 may be provided at the upper portion of the chamber 18 connecting the chamber with the opening 14 so that air may not accumulate in the chamber 18.

When a charge of shot is fired against the front face of the target plate 11 there will be a tendency for the plate 11 to vibrate at its natural period each time it is struck by a shot pellet. This tendency to vibrate is completely overcome by the presence of the layer of viscous oil at the rear of the plate. When the first shot of a charge strikes, the kinetic energy of the shot will be expended in moving the plate 11 backwardly and thus to force oil through the passage 24 into the chamber 18. This will compress the resistance pile 28, decreasing the resistance thereof. The tendency of the plate to rebound is overcome by the cohesion of the molecules of the viscous oil in the chamber 14. This cohesion exerts a tremendous force resistance to rapid vibratory movements of the plate 11 so that vibration is completely overcome and the plate will remain in its compressed position so long as shot pellets continue to strike the front face of the plate. After the last pellet has struck and there is no longer any force exerted against the front face due to the impinging shot, the pressure exerted by the diaphragm 21 on the oil in the chamber 18, together with the restoring force of the plate 11 itself, will force the oil back through the perforation 24 and the plate 11 will move back to its original position. Thus the resistance of the pile 28 will be decreased throughout the entire time that the charge of shot occupies in striking the face of the plate 11. The resistance 28 may be connected with a suitable recording instrument which will make a record of the time the resistance is decreased by the impact of the charge of shot. Oscillographs of well-known construction may be used for this purpose, but the particular nature of the electrical recording instrument or the particular carbon stack itself forms no part of the present invention, except as it is used in combination with the other features shown and described.

Figure 3:
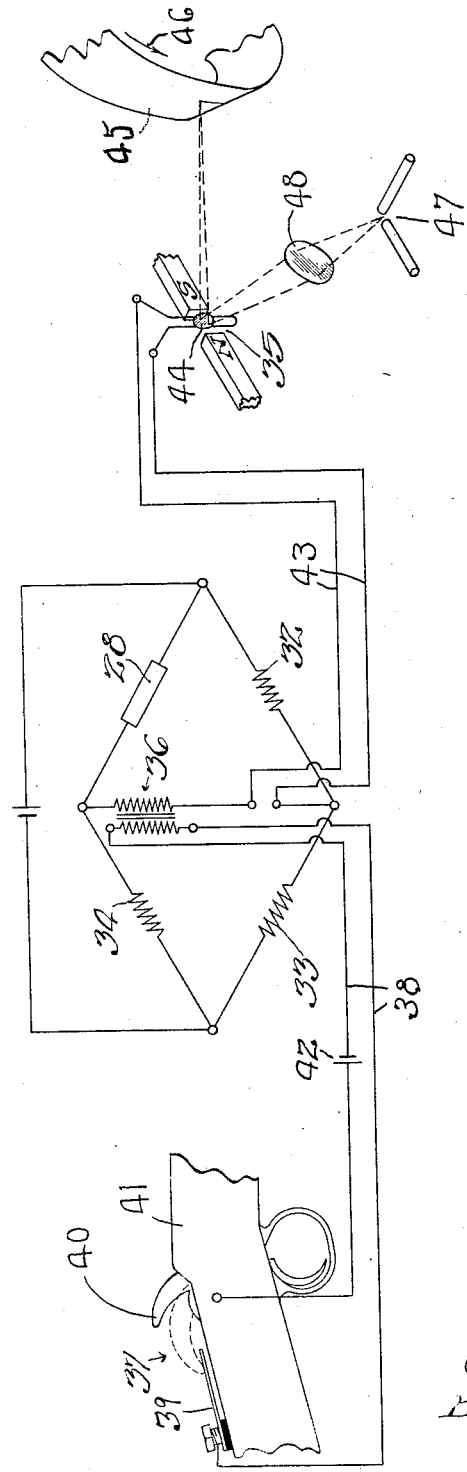
Fig. 3 is a diagram of an electric circuit used in connection with the invention.

Fig. 3 shows diagrammatically one form of electrical circuit which may be used for recording the period of time that the resistance pile 28 is affected by the impact of the charge of shot. In this figure, the numeral 28 designates the resistance pile connected in one leg of a Wheatstone bridge, while resistances 32, 33 and 34 are connected in the other legs. When the meter is inactive the bridge is balanced so that no current flows through the cross-connection containing the oscillograph 35. During the time that a charge of shot is striking the plate 11 the resistance 28 will be decreased so that current will flow through the recording instrument 35 which will make a record of the length of time the decrease in resistance continues. In order that the velocity of the shot during this time may be computed, means is provided for comparing the record made by the shot string meter with the time required for the charge of shot to travel the entire range. This is accomplished by means of a transformer 36 connected in circuit with the oscillograph 35, as shown in Fig. 3. The primary of the transformer 36 is connected by means of the conductors 38 to a switch 37 formed by the contact spring 39 and the gun hammer 40 of the gun 41. A battery 42 is located in the circuit formed by the conductors 38, the switch 37 and the primary of the transformer 36.

It will thus be seen that when the gun 41 is cocked the hammer 40 will be in its dotted line position as shown in Fig. 3 and the switch 37 will be closed. When the gun is discharged the switch 37 will be opened which will cause an electric impulse to travel through the secondary of the transformer 36 and through the conductors 43 which are connected to the oscillograph 35. The mirror 44 of the oscillograph will therefore be oscillated and such oscillation will be indicated on the photographic film 45 which is moving in the direction of the arrow 46. An arc lamp 47 projects a beam of light through the lens 48 onto the mirror 44 which reflects such beam of light onto the film 45.

Fig. 3 therefore diagrammatically illustrates that an impulse is caused to travel through the circuit of the oscillograph 35 at the time of the discharge of the gun and the recording instrument comprising the moving film 45 will indicate the lapse of time between the discharge of the gun and the impact of the shot upon the target plate 11. This time divided by the length of the range will give the average velocity, and by multiplying this velocity by the time during which the shot string is impinging on the target plate, the length of the shot string may be ascertained.

It is apparent that it is of prime importance to overcome the natural vibration of the plate 11, and this is accomplished not by the production of a partial vacuum in the rear of the plate which will afford only a small force, but by the cohesion of the molecules of the viscous oil contained in the space 14 which produces an enormous force to overcome vibration. To insure proper resistance from this source it is important that the oil be free from air bubbles.

Various changes may be made in the details of construction without departing from the spirit and scope of the invention as defined in the following claims.

I claim:—

1. In a shot string meter a target member movable by a charge of shot impinging thereon, and means for registering the period of time said target member is so moved.

2. In a shot string meter a target member movable by a charge of shot impinging thereon, means for registering movement of said target member, and means for damping said target member to prevent vibration thereof.

3. In a shot string meter a target member arranged to move when a charge of shot impinges thereon, means for damping said target member to prevent vibration thereof, and means for registering the period of time said target member is moved from its initial position.

4. In a shot string meter a target plate for intercepting a charge of shot, means for registering movement of said plate, and means for supporting a mobile substance in contact with said plate for preventing vibration of said plate.

5. In a shot string meter a target plate, means for forming a chamber adjacent one face of said plate, means for registering movement of said plate, and viscous material disposed in said chamber to resist vibration of said plate.

6. In a shot string meter a target plate arranged to be deflected from initial position when a charge of shot impinges thereon, means for registering the period of time that said plate is deflected from its initial position, and means for damping vibrations of said plate.

7. In a shot string meter a target plate, an inertia member disposed adjacent one face of said plate and spaced therefrom to provide an opening between said inertia member and plate, means for registering movement of said plate, and viscous material inclosed in said opening to resist vibration of said plate.

8. A shot string meter comprising a target plate, an inertia member disposed adjacent one face of said plate and spaced therefrom to provide a chamber between said member and plate, viscous material disposed in said chamber to resist vibration of said plate, and means connected with said plate for registering the period of deflection of said plate from its initial position.

9. A shot string meter comprising a target plate, an inertia member disposed adjacent one face of said plate and spaced therefrom, viscous material interposed between said member and plate, means forming a chamber connected with the space between said member and plate, a diaphragm forming one wall of said chamber, means connecting said diaphragm and plate, and means operated by the movement of said diaphragm for registering movements of said plate.

10. A shot string meter comprising an inertia member, a target plate disposed adjacent said inertia member and spaced therefrom to form an opening between said member and plate, means forming a chamber at the side of said inertia member opposite said plate, said inertia member having a perforation therethrough connecting said chamber and the space between said member and plate, a diaphragm forming a wall for said chamber, a rod extending through the opening in said inertia member and connecting said diaphragm and plate, an electric circuit, a variable element in said electric circuit controlled by said diaphragm, and viscous material disposed in said chamber and the space between said inertia member and plate.

11. A shot string meter comprising an inertia member, a plate disposed adjacent said inertia member and spaced therefrom to provide an opening between said member and plate, means for registering movement of said plate, viscous material disposed in said opening, and a reservoir connected with said opening for supplying material thereto.

12. A shot string meter comprising a target plate, means for registering movement of said plate, means forming an opening adjacent one face of said plate, and a pressure reservoir connected with said opening to supply viscous material thereto, said reservoir being connected with said opening adjacent the lower portion thereof, there being a vent connected with the upper portion of said opening.

13. In combination, a shot string meter having an impact member, an instrument for registering the duration of impact of a charge of shot on said member, and means connected with said instrument and arranged to be operated when a charge of shot is fired for causing said instrument to register duration of travel of said charge over a given range.

14. In combination, an instrument for registering duration of electrical impulses, a shot string meter connected with said instrument, and means for supplying an impulse to said instrument at the time of discharge of a charge of shot.

15. In combination, an instrument for measuring duration of electrical impulses, a circuit comprising a Wheatstone bridge in which said instrument is connected, a shot string meter for changing the balance of said bridge during impact of a charge of shot thereon, and means adapted to be operated by the discharge of a gun for supplying an electrical impulse to said meter upon discharge of a gun.

16. In combination, a target member, an electric circuit having a variable resistance therein, means for connecting said target member with said resistance to vary said resistance during impact of a charge upon said target member, means for damping said target member against vibration, and an instrument in circuit with said resistance for registering duration of impact of said charge upon said target member.

17. In combination, a target plate, an inertia member disposed adjacent one face of said plate and spaced therefrom, means for supplying viscous liquid under pressure to the space between said inertia member and plate, an electric circuit having a variable element therein, means for connecting said target plate to said resistance to vary said resistance during impingement of a charge of shot on said plate, an instrument connected with said circuit for registering the period of deflection of said plate, and means connected with said instrument for causing said instrument to register the period between the discharge of the gun from which said charge is fired and the impact of said charge upon said plate.

18. A shot string meter comprising in combination an inertia member, a target plate movable by a charge of shot impinging thereon mounted at one side of said inertia member, viscous vibration dampening liquid between said member and plate, a liquid filled chamber at the side of said member opposite said plate, a diaphragm forming one wall of said chamber, a rod connecting said plate and diaphragm through an orifice permitting communication between said first mentioned liquid and chamber, a circuit having a variable resistance connected with said diaphragm, and an instrument in said circuit for registering the period of time that said target plate is moved by the impingement of said charge of shot thereon.

In testimony whereof I have signed my name to this specification on this 1 day of June A. D. 1927.

PHILIP P. QUAYLE.